(No Model.)
M. L. MARDIS & J. W. BRITTON.
H. MORROW, Administrator of J. W. BRITTON, Deceased.
CAR COUPLING.
No. 425,684. Patented Apr. 15, 1890.
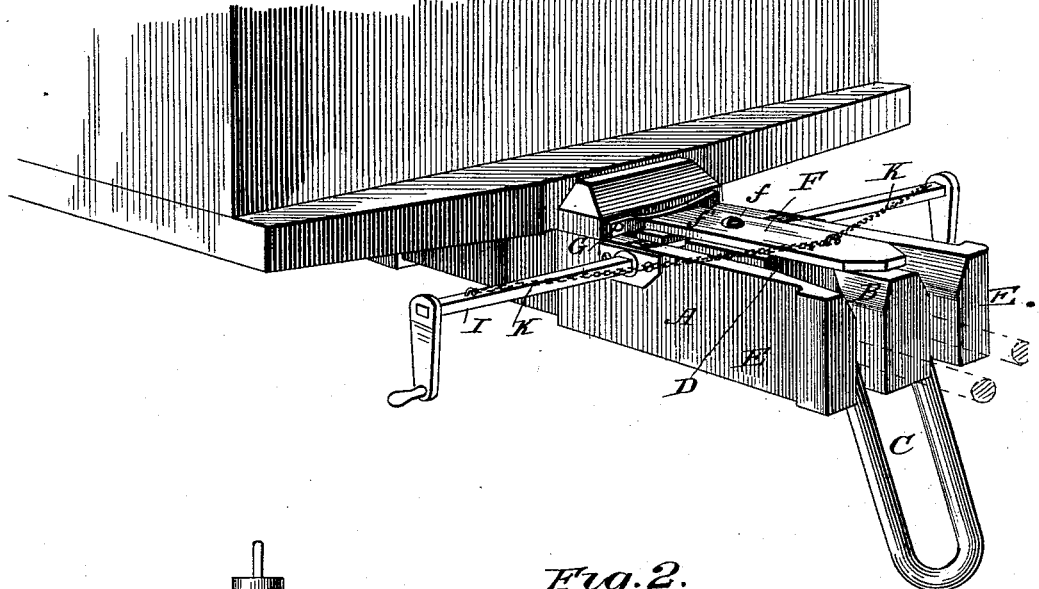
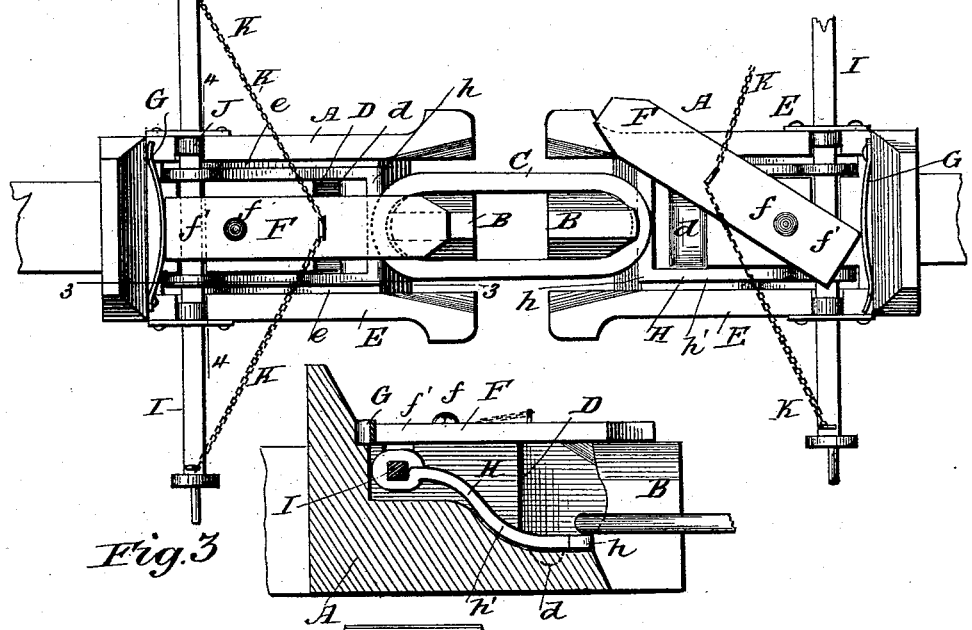
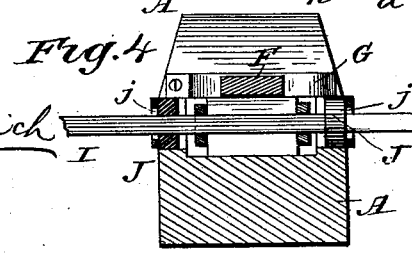
WITNESSES:
Fred G. Dieterich
P. B. Turpin
INVENTOR
Martin L. Mardis
John W. Britton
BY
ATTORNEY
THE NORRIS PETERS CO., PHOTO-LITHO., WASHINGTON, D. C.

United States Patent Office.

MARTIN L. MARDIS AND JOHN W. BRITTON, OF NEW LISBON, OHIO; HARVEY MORROW ADMINISTRATOR OF SAID JOHN W. BRITTON, DECEASED.

CAR-COUPLING.

SPECIFICATION forming part of Letters Patent No. 425,684, dated April 15, 1890.

Application filed August 26, 1889. Serial No. 322,033. (No model.)

*To all whom it may concern:*

Be it known that we, MARTIN L. MARDIS and JOHN W. BRITTON, of New Lisbon, in the county of Columbiana and State of Ohio, have invented a new and useful Improvement in Car-Couplings, of which the following is a specification.

Our invention is an improved car-coupling having for its objects among others to provide novel constructions by which to facilitate the coupling and uncoupling of cars without danger to the train-hands; to prevent the cars when once coupled from becoming accidentally uncoupled; to enable the coupling-hook to be suspended from the draw-head in such position that is not likely to be easily broken, and to so construct and support a single shaft that it may serve to operate both the link-ejector and the lock-bar.

The invention has for further objects other improvements; and it consists in certain novel constructions and combinations of parts, as will be hereinafter described, and pointed out in the claims.

In the drawings, Figure 1 is a perspective view of one end of a car provided with our improvements. Fig. 2 is a top plan view of two couplings constructed according to our invention. Fig. 3 is a section on about line 3 3, Fig. 2; and Fig. 4 is a cross-section, all of which will be described.

The draw-head A is provided with a hook B, adapted for engagement by the coupling-link C. In rear of this hook we provide an upright face or partition D, against which the link may be rested when raised to vertical position, at the base of which face D we prefer to form a socket or recess $d$ to receive the end of the link when so raised and steady the said link in position. Alongside of the hook B we extend side plates or guides E, which project forward to the front end of the hook, operate in a manner as bumpers, and relieve the hook of the shock of the impact of two meeting draw-heads. A sufficient space $e$ is formed between the plates E and hook B for the arms of the link, and such spaces $e$ open at the bottom of the draw-head and so permit a link held in one draw-head to hang vertically down and so be out of danger of being damaged by the striking of such draw-head against another.

Now, to hold the link in engagement with hook B we prefer to provide a lock-bar F. Such bar is movably supported, whereby it may be adjusted to close or clear the hook, is preferably movable laterally on and off the hook, and is also preferably pivoted so it may easily and accurately be moved, as desired. In the construction shown we pivot the bar F at $f$, its forward arm being extended and adapted to be moved onto and clear of the hook and having an extension $f'$ in rear of pivot $f$. To hold the bar F in locked position— that is to say, in position to close the hook— we provide a spring which by its tension operates to secure the lock-bar in such position, and yet permits it to be forcibly moved to one side or the other when it is desired to open the hook. In the construction shown this spring G is a flat curved bar secured to the framing, curved outwardly and engaging the extremity or rear end of extension $f'$ of the locking-bar F, so as to hold such bar, when in locked position, from jarring out of the same. When in locked position, this bar F secures the link in engagement with the hook so that it cannot possibly jar thereout.

It will be noticed that the bar F does not exceed in width the space between the arms of the coupling-link, so that the latter may be turned over the lock-bar when adjusted to vertical position.

To enable the quick removal of the link from the draw-head, we provide the ejector H, having a cross-bar $h$ and the arm or arms $h'$, the cross-bar $h$ fitting, when lowered, in a groove or recess just in rear of the hook and the arms extended back and connected with the shaft I, by properly turning which the ejector may be operated to lift its cross-bar $h$ and force the link up off the hook. By preference the ejector is keyed to the shaft by having its arm or arms provided with non-circular openings and making the shaft non-circular to fit therein, so the turning of the shaft may effect the movement of the ejector, while the shaft may be moved longitudinally independent of the ejector. When the shaft is made in the non-circular form shown, it is preferred to provide the bearing-blocks J J, which have non-circular openings *j* in which the shaft is held and movable longitudinally, the said blocks J being journaled in the draw-head, as shown. This shaft I is connected with the lock-bar, so its longitudinal movement may effect the movement of the said lock-bar to close the hook or clear the same, as may be desired. Now, this connection may be effected in various ways; but we prefer to accomplish it by means of chains K or the like—such as cords, ropes, or cogs—extended between the opposite ends of the shaft and the locking-bar, so that the movement of the shaft longitudinally may effect the adjustment of the bar F from locked to unlocked position, or vice versa.

In operation, to couple the cars the link is held by the hook of one draw-head, the lock-bar adjusted to locked position, and the link raised to vertical position, resting against face D, with its lower end in recess *d*. The other draw-head has its lock-bar adjusted to unlocked position, and the two draw-heads are brought forcibly together, when the impact will jar the link down into engagement with the hook of the meeting draw-head, when the lock-bar of the latter may be adjusted to locked position and the coupling is completed. To uncouple, it is only necessary to draw or push the shaft longitudinally to move bar F clear of the hook, when the shaft may be turned to cause the ejector to force the link off the hook. It will be seen that the coupling and uncoupling may be effected from either side of the car and without requiring any one to go between the cars.

Having thus described our invention, what we claim as new is—

1. In a car-coupling, the combination of the link-securing hook, the lock-bar movable into position to hold the link in engagement with the hook, and the shaft movable longitudinally and connected with the lock-bar, substantially as set forth.

2. In a car-coupling, the hook arranged for engagement by the link, combined with the lock-bar by which to hold the link in such engagement, the said lock-bar being movable laterally toward and from the hook and to both sides thereof, substantially as set forth.

3. In a car-coupling, the draw-head having a hook for engagement by the link and provided with a lock-bar by which to hold the link in such engagement, said bar being pivoted in rear of the said hook and movable laterally at its forward end, whereby it may be adjusted over or laterally off the hook, substantially as set forth.

4. In a car-coupling, the draw-head having a hook for engagement by the coupling-link, a locking bar or piece movably supported, whereby it may be adjusted to hold the link in such engagement, and a spring engaging the lock-bar and operating by its tension to hold the said bar in locked position, substantially as set forth.

5. In a car-coupling, the combination, substantially as described, of the hook adapted for engagement by the coupling-link, the lock-bar pivoted near its rear end, having its forward end arranged and adapted for adjustment to close the hook, and provided in rear of its pivot with an extension, and the spring arranged to engage such rear extension of the locking-bar, substantially as set forth.

6. The combination of the hook adapted for engagement by the link, the lock-bar for holding the link in said engagement, the link-ejector for throwing the link out of such engagement, and the shaft connected with both such parts and adapted to operate the same, substantially as set forth.

7. In a car-coupling, the combination of the lock-bar, the link-ejector, the shaft keyed to said ejector, whereby it may be turned to operate or moved longitudinally independent thereof, and connections between the said shaft and the lock-bar, substantially as set forth.

8. In a car-coupling, the combination of the pivoted lock-bar, the link-ejector, the shaft keyed to said ejector and movable longitudinally, and chains or the like connecting the opposite ends of the shaft with the lock-bar, whereby the longitudinal movement of the shaft may effect a movement of the lock-bar, substantially as set forth.

9. The combination, in a car-coupling, of the draw-head, the ejector having its arm or arms formed with non-circular openings, the bearing-blocks journaled in the draw-head and having non-circular openings, the shaft made non-circular in cross-section and fitted in the openings of the bearing-blocks and ejector, all substantially as set forth.

10. The improvement in car-couplings herein described, consisting of the draw-head provided with a hook for engagement by the link, provided on opposite sides of said hook with side plates or guides, provided in rear of such hook with an upright face or shoulder and having at the base of such face or shoulder a socket or depression forming a seat for the end of the link, the lock-bar pivoted at its rear end and movable at its forward end over the hook, the link-ejector and the shaft keyed to the link-ejector and connected with the lock-bar, such shaft being movable longitudinally to operate the lock-bar and rotarily to operate the link-ejector, all substantially as and for the purposes set forth.

MARTIN L. MARDIS.
JOHN W. BRITTON.

Witnesses:
M. D. MENTI,
T. C. BROUGHTON.